US006614903B1

United States Patent
Flockhart et al.

(10) Patent No.: US 6,614,903 B1
(45) Date of Patent: Sep. 2, 2003

(54) METHODS AND APPARATUS FOR SERVICE STATE-BASED PROCESSING OF COMMUNICATIONS IN A CALL CENTER

(75) Inventors: Andrew Derek Flockhart, Thornton, CO (US); Robin H. Foster, Little Silver, NJ (US); Joylee E. Kohler, Northglenn, CO (US); Eugene P. Mathews, Barrington, IL (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/461,902

(22) Filed: Dec. 15, 1999

(51) Int. Cl.⁷ ................................................. H04M 3/00
(52) U.S. Cl. ............................. 379/265.12; 379/265.06
(58) Field of Search ..................... 379/265.06, 265.09, 379/265.1, 265.11, 265.12, 266.02, 266.04, 309

(56) References Cited

U.S. PATENT DOCUMENTS

| | | | | |
|---|---|---|---|---|
| 5,206,903 A | | 4/1993 | Kohler et al. ........... | 379/265.12 |
| 5,299,259 A | * | 3/1994 | Otto ....................... | 379/112.01 |
| 5,452,350 A | * | 9/1995 | Reynolds et al. ....... | 379/112.01 |
| 5,825,869 A | * | 10/1998 | Brooks et al. .......... | 379/265.12 |
| 5,905,793 A | | 5/1999 | Flockhart et al. ...... | 379/266.02 |
| 6,163,607 A | * | 12/2000 | Bogart et al. ........... | 379/265.02 |
| 6,263,066 B1 | * | 7/2001 | Shtivelman et al. ... | 379/210.01 |
| 6,408,066 B1 | * | 6/2002 | Andruska et al. ....... | 379/265.12 |
| 6,535,492 B2 | * | 3/2003 | Shtivelman ................. | 370/270 |

OTHER PUBLICATIONS

"CentreVu® Virtual Routing: Cost–Effective Multisite Routing That Delivers Calls to the Best Place, the First Time," Lucent Technologies Inc., pp. 1–4, Aug. 1998.

"CentreVu® Advocate: The Revolutionary Routing Solution That Makes the Best Decision Every Time, Automatically," Lucent Technologies Inc., pp. 1–4, Aug. 1998.

J.P. Anderson et al., "Uncovering Maximum Leverage in Call Center Performance," Call Center Management, pp. 1–3, 1998.

"Lucent Technologies CentreVu® Call Center Solutions: CentreVu Virtual Routing," Lucent Technologies Inc., pp. 1–2, 1998.

(List continued on next page.)

Primary Examiner—Ahmad F. Matar
Assistant Examiner—Quynh Nguyen
(74) Attorney, Agent, or Firm—Ryan, Mason & Lewis, LLP

(57) ABSTRACT

A call center is configured to determine which of a number of designated service states is associated with a particular skill or type of communication supported by one or more agents of the call center. A particular one of the states represents a branded service level, while other states represent over-service and under-service conditions. If the particular skill or type of communication is determined to be associated with a service state other than that corresponding to the desired branded service level, a communication processing function of the call center is adjusted so as to return the skill or type of communication to the desired branded service level state. An example of such an adjustment is a dynamic agent pooling, in which a pool of agents available to perform work for the particular skill varies in accordance with the current service state of that skill. The call center processing operations may also perform appropriate tests to determine if predictors generated by certain predictive algorithms should be used in the service state determination process. A branded service metric may be used to characterize the performance of the call center with respect to the desired branded service level.

20 Claims, 4 Drawing Sheets

OTHER PUBLICATIONS

"Lucent Technologies CentreVu® Call Center Solutions: CentreVu Advocate," Lucent Technologies Inc., pp. 1–2, 1998.

BCS Public Relations Press Releases, "Lucent Technologies Unveils Breakthrough Call Center Software That Improves Customers Care, Increases Sales and Reduces Costs: Predictive Algorithms Change Call Center Paradigm by Bringing Agent to Caller," Call Center '98, Dallas, Texas, pp. 1–3, Feb. 4, 1998.

"CentreVu® Advocate$^{SM}$ Research Simulation: Environments with CentreVu Adocate," Lucent Technologies Inc., pp. 1–3, 1998.

"Lucent's CentreVu® Advocate: Breakthrough Solutions for Success," Lucent Technologies Inc., pp. 1–4, 1998.

* cited by examiner

METHODS AND APPARATUS FOR SERVICE STATE-BASED PROCESSING OF COMMUNICATIONS IN A CALL CENTER

FIELD OF THE INVENTION

The invention relates generally to call centers or other call processing systems in which voice calls, e-mails, faxes, voice messages, text messages, Internet service requests or other types of communications are distributed among a number of service agents for handling.

BACKGROUND OF THE INVENTION

Call centers distribute calls and other types of communications to available service agents in accordance with various predetermined criteria. Existing call centers suffer from a number of drawbacks. For example, as will be described in greater detail below, such centers are generally unable to provide satisfactory techniques for branded service level processing, dynamic agent pooling, and dynamic use of predictive algorithms.

With regard to branded service level processing, the concept of branded customer service is generally understood to include the consistent delivery of a particular level of service in order to reinforce customer perception of the brand and cultivate long term loyalty. In existing call centers, there is a growing need to make sure that work tasks are performed in a targeted range of time, with minimal "over-service" or "under-service" of the end customer. However, existing call centers often simply assume that a shorter wait time is always preferred over a longer wait time, i.e., there is no concept of an over-service condition.

Although such an approach can be adequate if all customers are considered equally important, it fails to provide an appropriate tiered structure of customers or types of work that vary in urgency. For example, a conventional call center is generally not configured such that each call or other work task may start service within a pre-set range of time with minimal over-service or under-service. Each agent is assumed to be able to handle one or more types of skills, but the actual state or potential state of over-serving or under-serving on each of these skills is generally not known each time the agent becomes available. In addition, there is generally no clear understanding as to whether adding service at another call center site would improve the ability to handle the call or other work task in a more desirable amount of time.

Conventional call centers are also unable to provide an adequate metric for characterizing branded customer service. Such call centers generally use either Average Speed of Answer (ASA) or Percent in Service Level (PSL) as metrics for planning and reporting on their operations. However, each of these metrics can be problematic in that it can appear "good" while in fact masking poor operations. For example, a good ASA may be comprised of many zero wait times and a few unacceptably high wait times. As another example, two call centers may each report a PSL of 80% of calls answered in 20 seconds, but one of these two centers may have answered all of those calls in 0 seconds and the remaining 20% in 60 seconds, while the other center may have answered the 80% between 5 and 20 seconds and the remainder within 40 seconds. Clearly, the second call center is doing much better at delivering a consistent service level, but the PSL metric of 80% in 20 seconds does not reveal the true differences in performance. These conventional metrics thus allow an under-service condition to be hidden effective branded service level processing requires a metric that penalizes for both over-service and under-service conditions, while also rewarding for service provided within a defined branded range. Such a metric is generally not available in conventional call centers.

With regard to agent pooling, it is apparent that the number of agents working on a particular skill needs to be increased in order that actual or potential caller wait time problems, e.g., too long a wait, are cleared as rapidly as possible so that operation returns to the branded service level. Similarly, the number of agents working on a skill needs to decrease as the service state drops to an over-service condition in order to avoid such a condition.

Conventional call centers rely primarily on manual intervention to change the number of agents working on any particular skill. Agents are added to improve performance or removed when performance is better than required. Although some existing call centers automate much of this process, such centers nonetheless fail to allow for dynamic, predictive changes in agent pooling for both under-service and over-service conditions.

With regard to predictive algorithms, it is known that call center operations can be dramatically improved when such algorithms are used to predict consequences of actions. These algorithms and their corresponding predictors can be very accurate when call volumes are sufficiently high, and decisions made using these predictors in this situation can be very effective and beneficial. For example, a prediction can affect whether a call center allows more or fewer agents to handle calls for a particular skill. Insufficient accuracy can therefore lead to undesirable under-service or over-service conditions. It is therefore very important that the predictor be accurate. Unfortunately, as call volume decreases below a sufficient level, predictors can become less accurate.

Decisions made with a less accurate predictor may still be effective enough to have a valuable impact. Eventually, however, with a low enough call volume, the accuracy of the predictive algorithm becomes suspect to the point that the predictor should be disregarded and decision making should be based on other factors. Conventional call centers, however, have been unable to provide suitable techniques for determining whether a given predictor is of suitable accuracy for use each time a decision is to be made based on that predictor. In addition, such call centers fail to provide adequate alternative decision factors for use when a predictor is not sufficiently accurate to be used. Low call volume situations are often encountered at night or on weekends in a call center. Such situations have been worked around using, e.g., time of day/day of week branching in vectors which govern call flow. However, this approach is generally not useful if a low call volume situation does not regularly occur under specific time of day/day of week conditions.

As is apparent from the foregoing, a need exists for techniques for providing features such as branded service level processing, branded service metrics, dynamic agent pooling and dynamic use of predictive algorithms in a call center.

SUMMARY OF THE INVENTION

The invention provides methods and apparatus which improve the processing of calls or other communications in a call center. More particularly, the invention in an illustrative embodiment provides techniques for implementing branded service level processing, branded service metrics, dynamic agent pooling, and dynamic use of predictive algorithms in a call center.

In accordance with one aspect of the invention, a call center is configured to determine which of a number of designated service states is associated with a particular skill or type of communication supported by one or more agents of the call center. A particular one of the states represents a branded service level, while other states represent over-service and under-service conditions. If the particular skill or type of communication is determined to be associated with a service state other than that corresponding to the desired branded service level, a communication processing function of the call center is adjusted so as to return the skill or type of communication to the desired branded service level state.

In accordance with another aspect of the invention, a branded service metric may be used to characterize the performance of the call center with respect to the desired branded service level. The branded service metric preferably provides a certain maximum score for handling a communication within a specified branded range, and a lower score for handling a communication with a particular amount of over-service or under-service. The branded service metric may also include a reference to the specified branded range.

In accordance with a further aspect of the invention, the above-noted adjustment in a communication processing function of the call center comprises dynamic agent pooling, in which a pool of agents available to perform work for the particular skill or type of call varies in accordance with the current service state of that skill. In this case, a different agent pool may be specified for each of at least a subset of the plurality of service states by specifying a different set of skill preferences for each of the service states in the subset.

In accordance with yet another aspect of the invention, the call center processing operations may also perform appropriate tests to determine if predictors generated by certain predictive algorithms should be used in the service state determination process. Examples of tests that may be used in conjunction with this aspect of the invention include a weighted advance time (WAT), the number of communication arrivals in a designated period, and an average communication handling time in a designated period.

These and other features and advantages of the present invention will become more apparent from the accompanying drawings and the following detailed description.

DETAILED DESCRIPTION OF THE INVENTION

Although the invention will be illustrated below in conjunction with the processing of calls in an exemplary call center, it is not limited to use with any particular type of call center or communication processing application. For example, the invention is applicable to the processing of incoming communications, outgoing communications or both. The disclosed techniques can be can be used with automatic call distribution (ACD) systems, telemarketing systems, private-branch exchange (PBX) systems, computer-telephony integration (CTI)-based systems, as well as in combinations of these and other types of call centers. A call center in accordance with the invention may be configured using any type of network infrastructure, such as, e.g., asynchronous transfer mode (ATM), local area networks, wide area networks, Internet Protocol (IP) networks, etc. The term "call center" as used herein is thus intended to include any type of ACD system, telemarketing system or other communication system which processes calls or other service requests, including voice calls, video calls, multimedia calls, e-mail, faxes, text chat or voice messages as well as various portions or combinations of these and other types of communications. The term "call" as used herein is intended to include any of the above-noted types of communications as well as portions or combinations of these and other communications.

Figure 1:
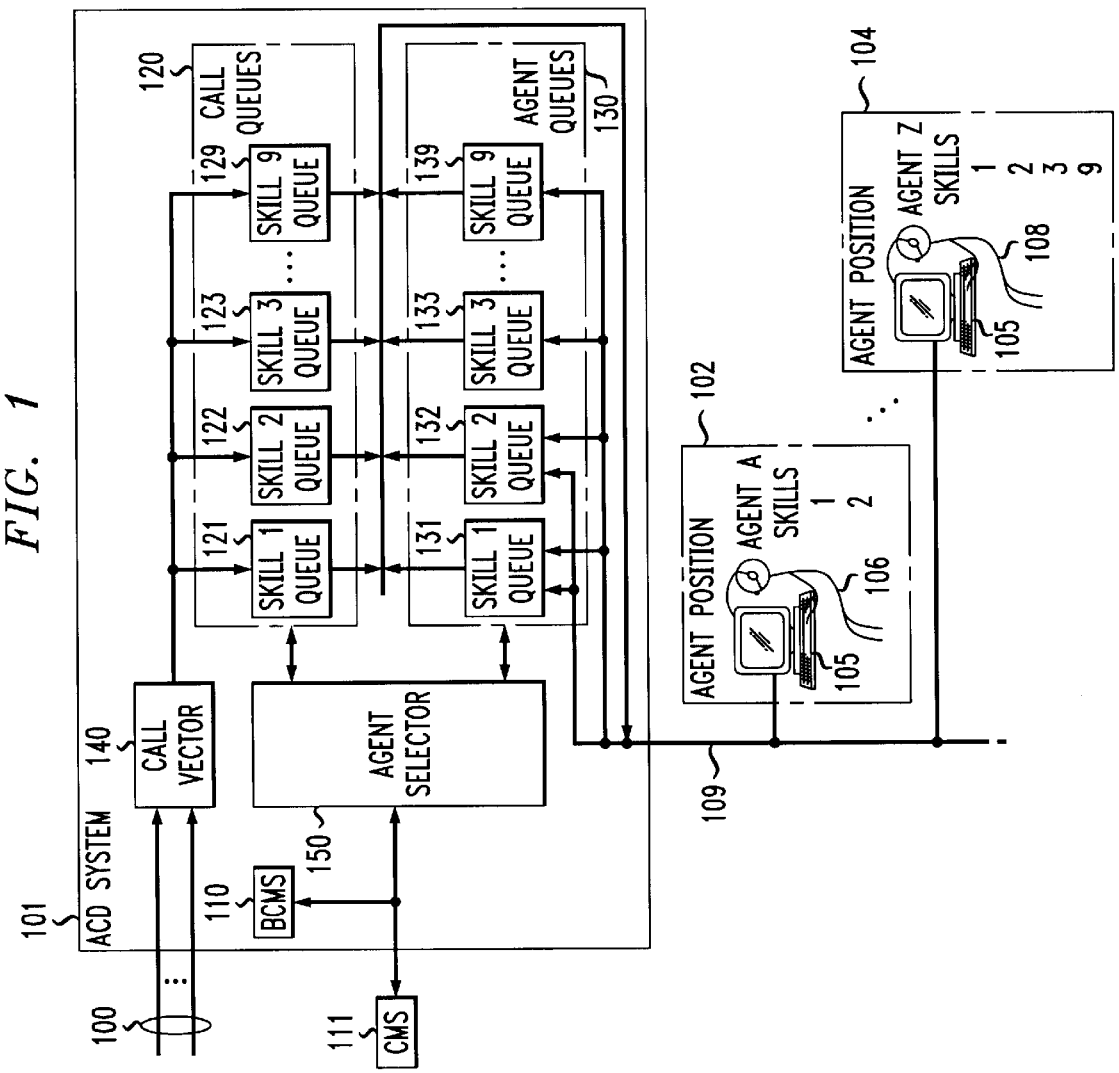
FIG. 1 is a block diagram of a call center in which one or more aspects of the present invention may be implemented.

FIG. 1 shows an illustrative call center in which the present invention may be implemented. The call center includes a number of telephone lines and/or trunks 100 selectively interconnected with a plurality of agent positions 102–104 via an ACD system 101. Each agent position 102–104 includes a voice-and-data terminal 105 for use by a corresponding agent 106–108 in handling calls. The terminals 105 are connected to ACD system 101 by a voice-and-data transmission medium 109. The ACD system 101 includes a conventional basic call management system (BCMS) 110, and is also connected to a conventional external call management system (CMS) 111. The BCMS 110 and CMS 111 gather call records, call center statistics and other information for use in managing the call center, generating call center reports, and performing other functions. In alternative embodiments, the functions of the BCMS 110 and the CMS 111 may be provided using a single call management system internal or external to the ACD system 101.

Figure 2:
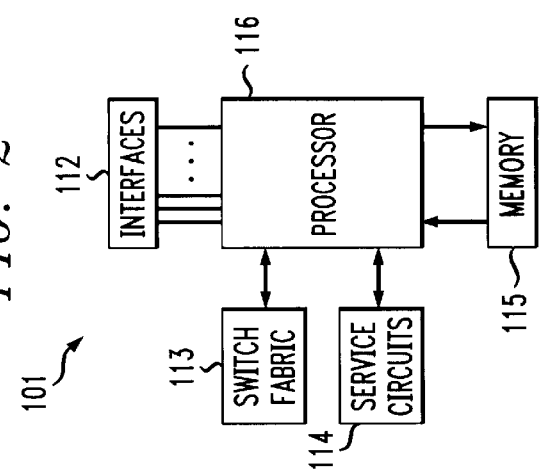
FIG. 2 is a block diagram of an automatic call distribution (ACD) system implemented in the call center of FIG. 1.

The ACD system 101 may be implemented in a manner similar to, for example, the Definity® PBX-based ACD system from Lucent Technologies. FIG. 2 shows a simplified block diagram of one possible implementation of ACD system 101. The system 101 as shown in FIG. 2 is a stored-program-controlled system that includes interfaces 112 to external communication links, a communications switching fabric 113, service circuits 114 (e.g., tone generators, announcement circuits, etc.), a memory 115 for storing control programs and data, and a processor 116 (e.g., a microprocessor, a CPU, a computer, etc. or various portions or combinations thereof) for executing the stored control programs to control the interfaces and the fabric, to provide automatic call distribution functionality, and to provide storage of e-mails, faxes and other communications.

Referring again to FIG. 1, exemplary data elements stored in the memory 115 of ACD system 101 include a set of call queues 120 and a set of agent queues 130. Each call queue 121–129 in the set of call queues 120 corresponds to a different agent skill, as does each agent queue 131–139 in the set of agent queues 130. As in a conventional system, calls are prioritized, and may be, for example, enqueued in individual ones of the call queues 120 in their order of priority, or enqueued in different ones of a plurality of call queues that correspond to a skill and each one of which corresponds to a different priority. Similarly, each agent's skills are prioritized according to his or her level of expertise in that skill, and agents may be, for example, enqueued in individual ones of the agent queues 130 in their order of expertise level, or enqueued in different ones of a plurality of agent queues that correspond to a skill and each one of which corresponds to a different expertise level in that skill. It should be noted that the invention can also be implemented in systems using a wide variety of other types of queue arrangements and queuing techniques.

The ACD system 101 further includes a call vector 140. The call vector 140 may be one of a number of different types of stored control programs implemented in system 101. Calls incoming to the call center on lines or trunks 100 are assigned by call vector 140 to different call queues 121–129 based upon the agent skill that they require for proper handling. Agents 106–108 who are available for handling calls are assigned to agent queues 131–139 based upon the skills which they possess. An agent may have multiple skills, and hence may be assigned to multiple agent queues 131–139 simultaneously. Such an agent is referred to herein as a "multi-skill agent." Furthermore, an agent may have different levels of skill expertise (e.g., different skill levels in a multi-level scale or primary (P) and secondary (S) skills), and hence may be assigned to different agent queues 131–139 at different expertise levels.

Call vectoring is described in greater detail in Definity® Communications System Generic 3 Call Vectoring/Expert Agent Selection (EAS) Guide, AT&T Publication No. 555-230-520, Issue 3, Nov. 1993, which is incorporated by reference herein. Skills-based ACD techniques are described in greater detail in, for example, U.S. Pat. No. 5,206,903 issued Apr. 27, 1993 in the name of inventors J. E. Kohler et al. and entitled "Automatic Call Distribution Based on Matching Required Skills with Agents Skills," which is incorporated by reference herein.

Another program executing in ACD system 101 is an agent selector 150. Selector 150 may be implemented in software stored either in the memory 115 of system 101, in a peripheral memory (e.g., a disk, CD-ROM, etc.) of system 101, or in any other type of computer readable medium associated with system 101, and executed by processor 116 or other suitable processing hardware associated with the ACD system 101. Selector 150 in this exemplary embodiment implements conventional techniques for providing an assignment between available calls and available agents. The conventional techniques implemented by selector 150 are well known in the art and will not be further described herein. It should be noted that these functions could be implemented in other elements of the ACD system 101, or using a combination of a number of different elements in such a system.

Further details regarding call processing in a system such as ACD system 101 can be found in, for example, U.S. Pat. No. 5,905,793 issued May 18, 1999 in the name of inventors A. D. Flockhart et al. and entitled "Waiting-Call Selection Based on Anticipated Wait Times," and U.S. patent application Ser. No. 09/022,959 filed Feb. 12, 1998 in the name of inventors A. D. Flockhart et al. and entitled "Call Center Agent Selection that Optimizes Call Wait Times," the latter having issued Feb. 20, 2001 as U.S. Pat. No. 6,192,122, both of which are incorporated by reference herein.

In accordance with the present invention, the call center of FIG. 1 is configured to include capabilities for implementing one or more of branded service level processing, branded service level metrics, dynamic agent pooling, and dynamic use of predictive algorithms. Each of these distinct aspects of the present invention will be described in greater detail below, with reference to FIGS. 3, 4 and 5.

Figure 3:
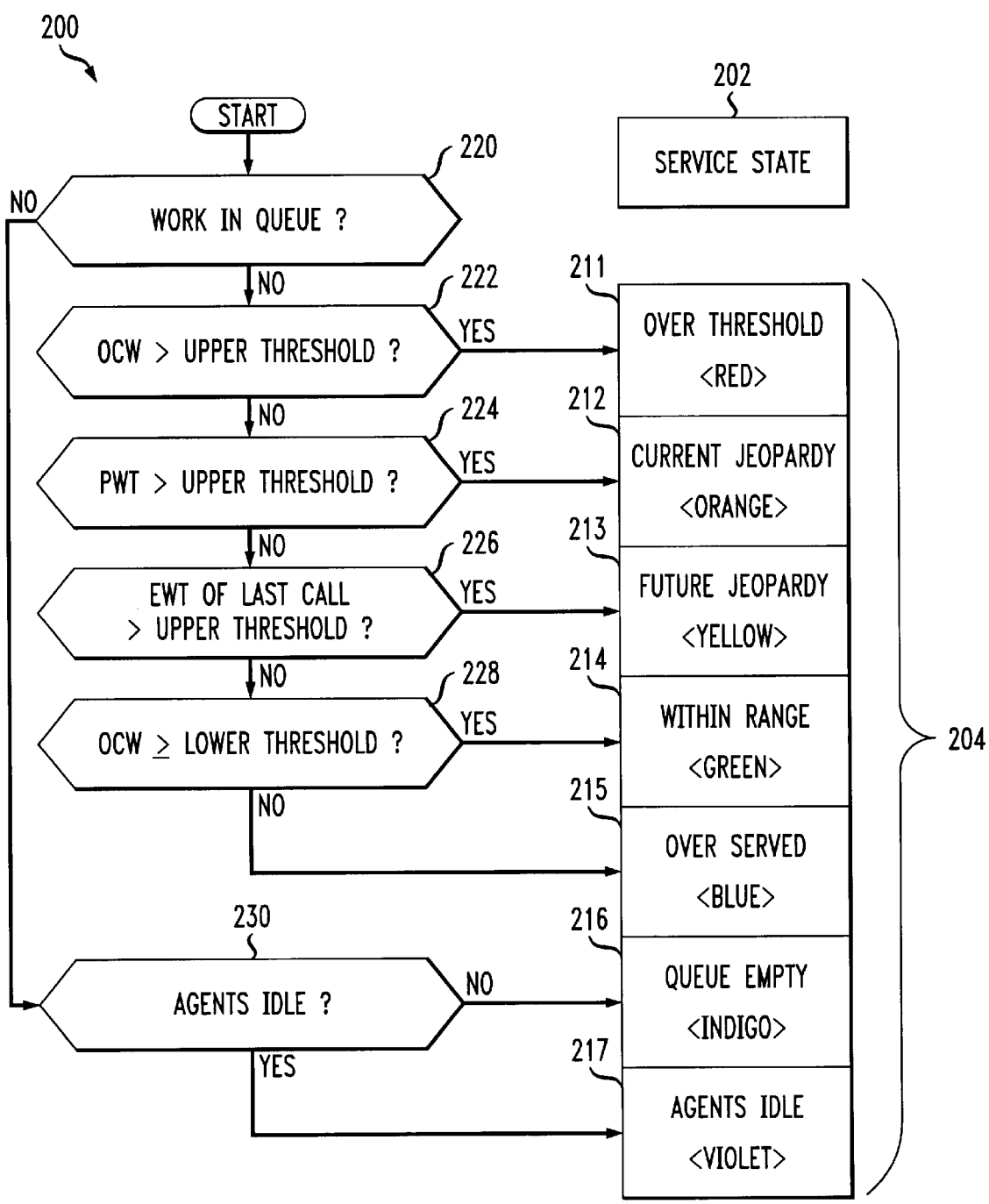
FIG. 3 is a flow diagram illustrating branded service level processing in accordance with the invention.

FIG. 3 is a flow diagram 200 illustrating a branded service level processing technique in accordance with the invention. As will be described in greater detail below, this technique defines, identifies and acts on branded service levels in a call center.

Associated with the flow diagram 200 of FIG. 3 is a service state indicator 202. The service state indicator 202 may take on any of the service states shown in a set of service states 204. Each of the service states in the set 204 represents a particular service status for a particular skill or type of call. It should be noted that the term "skill" as used herein is intended to include any type of work task that may be handled in a call center. Although the illustrative embodiments described below refer to service states associated with a particular skill, it will be apparent to those skilled in the art that the techniques are also applicable to particular types of calls or other communications.

In this example, the set of service states 204 includes an Over Threshold state 211, a Current Jeopardy state 212, a Future Jeopardy state 213, a Within Range state 214, an Over Served state 215, a Queue Empty state 216, and an Agents Idle state 217. Each of the states is associated with a particular display color, in order to facilitate interpretation of the information by a call center manager, agent, etc. More particularly, service states 211 through 217 are associated with the colors red, orange, yellow, green, blue, indigo and violet, respectively. It should be noted that the particular number and arrangement of service states shown in FIG. 3 is by way of example only, and other embodiments could include more or fewer states. In addition, other types of color schemes could be used in conjunction with the various service states.

A given one of the states in the set of service states 204, i.e., the Within Range state 214, represents a branded range in accordance with the invention. This branded range may be, e.g., a branded range of wait time that the call center Wants to deliver consistently for a particular skill. A more particular example of such a branded range is, e.g., 6 to 20 seconds of wait time for answering an incoming call. Other states in the set of service states 204 represent wait times above the branded range, i.e., under-served conditions, and below the branded range, i.e., over-served conditions. Appropriate rules can be enabled so as to ensure that as many calls as possible are answered within the branded range, to shorten waits that are longer than the branded range, and to minimize the number of calls handled outside of the branded range.

The processing operations shown in the flow diagram 200 of FIG. 3 will now be described in greater detail. In step 220, a determination is made as to whether or not there is work in queue for the particular skill. If there is work in queue, a determination is made in step 222 as to whether the oldest call waiting (OCW) has exceeded a specified upper threshold. If the OCW has exceeded this threshold, the skill is in the Over Threshold state 211. It should be noted that this is a fact, not a prediction. If the OCW has not exceeded the upper threshold, a determination is made in step 224 as to whether the predicted wait time (PWT) is greater than the upper threshold. If the PWT has exceeded this threshold, the skill is in the Current Jeopardy state 212. PWT incorporates both current wait time, which is factual information, and predicted future wait time, e.g., weighted advance time (WAT).

If PWT has not exceeded the upper threshold, a determination is made in step 226 as whether the expected wait time (EWT) of the last call in queue has exceeded the upper threshold. If the EWT of the last call has exceeded the upper threshold, the skill is in the Future Jeopardy state 213. If the EWT has not exceeded the upper threshold, a determination is made in step 228 as to whether the OCW is greater than or equal to a specified lower threshold. If so, the skill is in the Within Range state 214. Otherwise, the skill is in the Over Served state 215.

If step 220 determines that there is no work in queue for the particular skill, a determination is made in step 230 as to whether agents are idle. If there are no agents idle, the skill is in the Queue Empty state 216. Otherwise, the skill is in the Agents Idle state 217.

The processing operations of FIG. 3 may be repeated periodically for one or more different skills in order to determine whether the desired branded service level is being met for each of the skills. A number of actions can be taken or adaptations made within the call center based on the service state information determined using the FIG. 3 operations, e.g., in order to ensure that under-service and over-service conditions are minimized. Examples of such actions or adaptations include the following:

1. The dynamic resizing of the pool of agents handling a particular skill.
2. Modification of agent rest periods, e.g., based on agent occupancy, service states, etc. as described in U.S. patent application Ser. No. 09/228,992 filed Jan. 12, 1999 in the name of inventors R. H. Foster et al. and entitled "Methods and Apparatus for Determining Measures of Agent-Related Occupancy in a Call Center," which issued Mar. 19, 2002 as U.S. Pat. No. 6,359,982.
3. Redirection of a call from one call center to another call center in which a comparable skill is in a superior service state.
4. Selection or modification of caller announcements while in queue.
5. Intuitive assessment, real time or historical, of call center operations, based on the above described color-coded display of state information.
6. Use of new operational metrics for quantifying performance against a branded service target, such as, e.g., a branded service metric of the type to be described in detail below.
7. Reduction or increase in the number of agents assigned to outbound communications or other types of work based on the service state(s) of the corresponding skills.

The above-described branded service level processing can be used, e.g., to identify whether any call or other work task will be handled within a target range or how far out of target range the service of that item is expected to be. The technique can also be used to implement decisions or other actions for service, redirection, etc. in a single call center or multi-center enterprise based on the above-noted identifications and expectations, and can be used to identify and/or report on the probable or final status of any and all work tasks.

As previously noted, the particular service states shown in FIG. 3 are by way of example only. It should be noted that the particular number and arrangement of service states shown in FIG. 3 is by way of example only, and other embodiments could include more or fewer states. For example, another possible arrangement may include a Critical state, an Above Range state, a Jeopardy state, a Future Jeopardy state, a Within Range state, a Below Range state, a Queue Empty state, and an Agents Available state. The Critical state in such an arrangement may correspond to a state in which, e.g., an OCW measure is greater than a specified upper threshold.

In accordance with another aspect of the present invention, a branded service metric is provided that is particularly well-suited for use in a situation in which it is desirable for the call center to provide a targeted level of branded service. As noted previously, a branded service metric of this type may be used in the above-described branded service level processing to quantify performance against a branded service level target.

An example of a branded service metric in accordance with the invention is a grading system based on a scale of 0.0 to 4.0. Advantageously, such a metric may be configured to encompass one or more of the following desirable features (in this particular example, a roundoff to the nearest integer is assumed, but other arrangements could be configured to account for wait times measured in fractional units):

1. A maximum score for handling a call within a specified branded range, e.g., a call with a wait of 6 to 18 seconds gets a score of 4.0.
2. A lesser score for handling a call with a particular amount of over-service or under-service, e.g., wait times between 0 and 5 seconds and wait times from 19 to 35 seconds get scores of 3.0.
3. Even lesser scores as wait times increase above various thresholds, e.g., a score of 2.0 for calls answered between 36 seconds and 60 seconds; a score of 1.0 for calls answered between 61 seconds and 120 seconds; a score of 0.0 for calls answered after 121 seconds.

Alternatively, the scoring of the above-described metric may be based upon performance relative to the branded range, e.g., a score of 3.0 for a call answered within 120% of a top end of the branded range, a score of 2.0 for a call answered within 150% of the top end of the branded range, etc. It should be noted that numerous other scales could be used, e.g., scales resulting in scores greater than 4.0.

The branded service metric may incorporate penalty scores for abandoned calls when, e.g., abandonment occurs within or beyond the branded range, or any time an abandonment occurs.

An optional reference to the branded service level may be included in the branded service level metric in order to characterize the difficulty of the target, e.g., a score of 3.6 with a branded range of 6 to 24 seconds, a score of 3.2 with a branded range of 0 to 15 seconds, etc.

Advantageously, over-service cannot make up for under-service in this type of branded service metric. The inclusion of the branded range information provides additional meaning. For example, a branded service metric score of 3.8 with a branded range of 6 to 18 seconds is superior to a score of 3.8 with a branded range of 6 to 36 seconds. This type of metric can be computed on an interval basis or on a more real-time basis through the evaluation of a recent series of handled calls or other work tasks.

In addition, if the branded service ranges are re-defined, previously-handled calls or other work tasks could be re-scored to allow a call center manager to set expectations as to how well the current call center would perform against a different branded service level target. For example, if the branded range is tightened, it would be expected that the above-described branded service metric score would decrease unless changes were made to staffing or skills. But such a decrease could be approximated in advance by the-call center manager. Similarly, an increase in the branded service metric could be approximated in advance based on an expansion of the branded range.

It should be noted that the call center may be configured to respond to a change in the branded range by attempting to achieve that range.

Another aspect of the present invention relates to dynamic agent pooling in accordance with the above-described service states. This aspect of the invention provides a method to dynamically size a pool of agents who will be available to work on a specific skill based on the current service state of that skill. The service state of a skill is used to define the set of agents who will be considered in serving calls for that skill. As the service state of a skill moves from a branded range, e.g., Within Range state 214, toward an under-service condition, more agents will be considered to be available or eligible to take calls for that skill. As the service state of a skill moves from a branded range toward an over-service condition, fewer agents will be considered to be available or eligible. The agents are considered to be eligible if the preference level at which the skill is assigned is administered to be active when a skill is in a particular service state.

Figure 4:
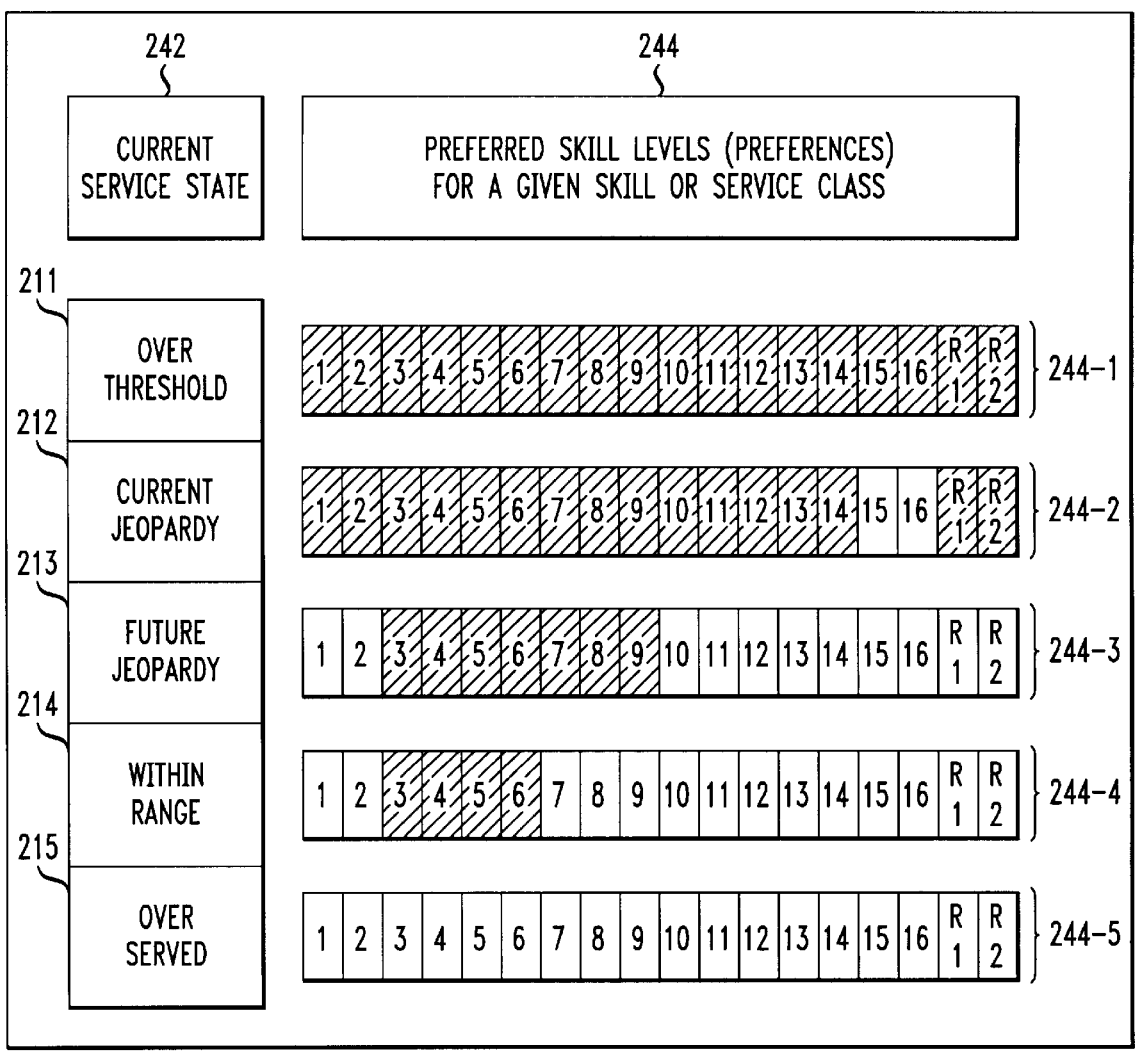
FIG. 4 illustrates dynamic agent pooling -in accordance with the invention.

FIG. 4 is a diagram illustrating a dynamic agent pooling process in accordance with the invention. A set of dynamic pooling information 240 includes a current service state 242 and a corresponding set of skill preferences 244 for a given skill or other service class. A different set of skill preferences 244-1, 244-2, 244-3, 244-4 and 244-5 is defined in this example for each of the service states 211, 212, 213, 214 and 215, respectively, which were previously described in conjunction with FIG. 3. Each of the sets of skill preferences 244-i, i=1, 2, . . . 5, includes at least subset of a total of sixteen skill levels 1–16, and two reserve skill levels R1 and R2. Skill level 1 represents the skills held by the most proficient agents, skill level 2 represents the skills held by the next most proficient agents, and so on. It should be understood that the particular arrangements shown in FIG. 4 are by way of example only, and numerous other arrangements could also be used, such as different numbers and types of skill levels, as will be apparent to those skilled in the art.

The particular skill levels that are part of a given set of preferences 244-i for a given service state are shown as shaded in that set. For example, the set of preferences 244-1 corresponding to the Over Threshold state 211 includes all sixteen skill levels 1–16 and both reserve skill levels R1 and R2, while the set of preferences 244-2 for the Current Jeopardy state 212 includes all of the skill levels with the exception of levels 15, 16 and R2. Similarly, the set of preferences 244-3 for the Future Jeopardy state 213 includes skill levels 3–9, the set of preferences 244-4 for the Within Range state 214 includes skill levels 3–6, and the set of preferences 244-5 for the Over Served state 215 does not include any of the skill levels. The Over Served state 215 may therefore allow no agents to handle calls in order to prevent any over-serviced calls. Notice also that the most proficient agents, i.e., those holding skill preference levels 1 and 2, will not be used for the given skill unless there is a Current Jeopardy service state.

In the dynamic agent pooling arrangement of FIG. 4, as the number of preference levels administered for a given service state increases, it can be expected that the number of agents in the pool will also increase. Therefore, as the skill moves from one service state to another, the agent pool is dynamically re-sized. In addition, the use of very proficient agents, e.g., those holding the skill at preference levels 1 or 2, can be avoided in cases of over-service or delayed until a particular level of under-service is anticipated. Advantageously, this aspect of the invention allows for dynamic, predictive changes to an agent pool not only when there is an under-service condition, but also when there is an over-service condition.

Another possible implementation of dynamic agent pooling in accordance with the invention is as follows. In this implementation, instead of being administered as a property of a skill, the pooling is administered as a property of the agent. For example, agents may have one of three roles for a given skill, i.e., regular, reserve or backup. In addition, each agent may have an "activation level" corresponding to a particular service state. Regular agents may have a fixed activation level of Within Range. Reserve agents may have an activation level of Future Jeopardy or higher, and are activated when the state of the skill is equal to or greater than the activation level of the agent. Backup agents may have an activation level of Within Range or higher, and are activated when there is no primary work, i.e., regular work, that they can serve and the state of the skill is equal to or greater than the activation level of the agent. Note that in such an arrangement it is possible to design a system in which no agents can service a call that is Over Served.

As previously noted, the specific dynamic agent pooling arrangements described above are by way of example only, and numerous alternative arrangements will be apparent to those skilled in the art.

Another aspect of the invention relates to dynamic use of predictive algorithms. This aspect of the invention enables the dynamic use of predictive algorithms in a call center with use based upon an evaluation of the effective applicability of the predictors in assessing the current service state of a given skill. More particularly, this aspect of the invention tests whether a predictor is of suitable accuracy for use each time a decision is to be made using the predictor, and also provides an alternative method of making the decision in the event that the predictor is not to be used.

Figure 5:
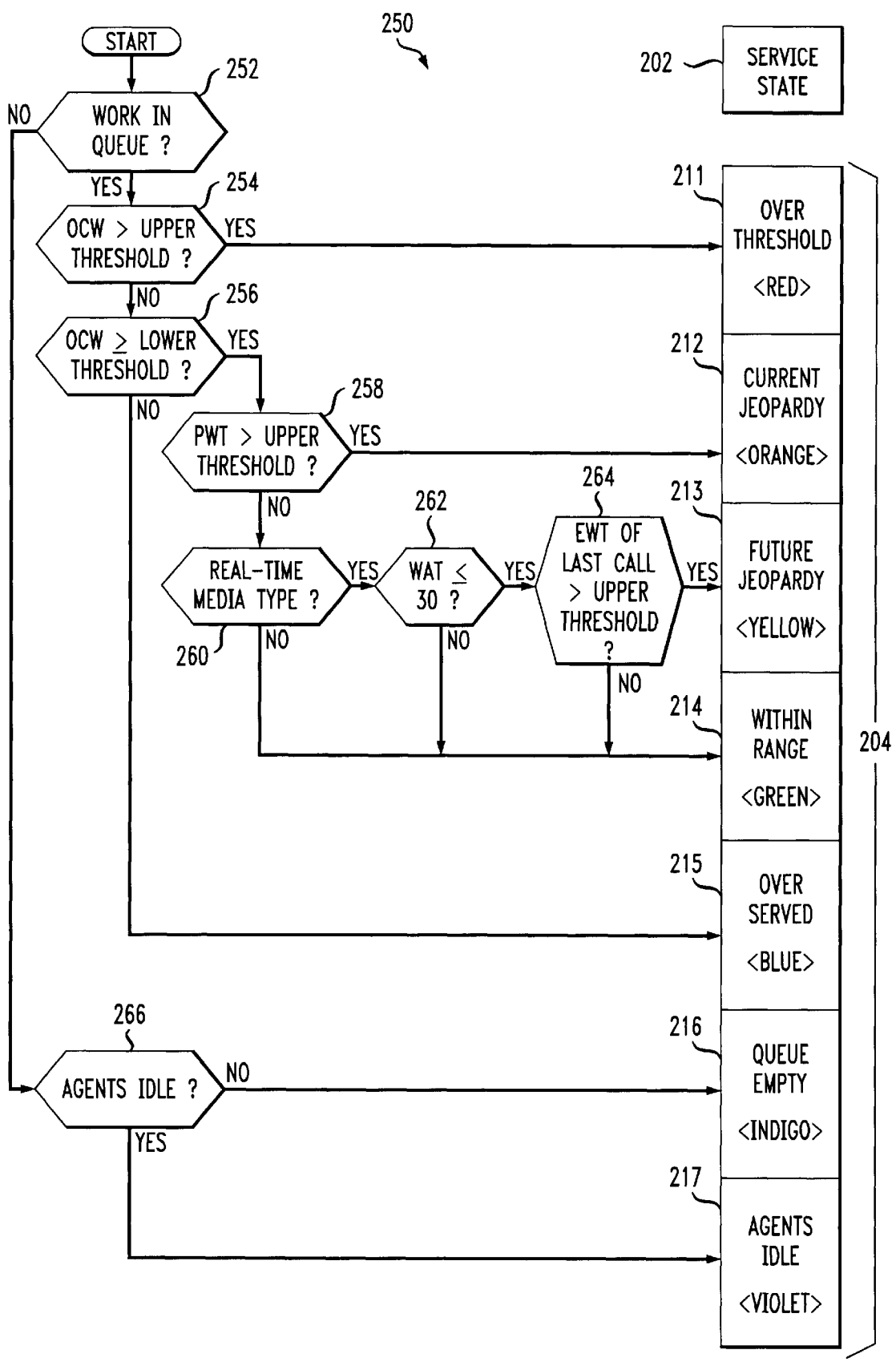
FIG. 5 is a flow diagram illustrating dynamic use of predictive algorithms in accordance with the invention.

FIG. 5 is a flow diagram 250 illustrating dynamic use of predictive algorithms in accordance with the invention, based on a service state indicator 202 that may be any one of the service states 211 through 217 in the exemplary set of service states 204 previously described in conjunction with FIG. 3. The flow diagram 250 includes processing operations that are carried out in the call center for a particular skill.

In step 252 of FIG. 5, a determination is made as to whether or not there is work in queue for the particular skill. If there is work in queue, a determination is made in step 254 as to whether the OCW has exceeded a specified upper threshold. If the OCW has exceeded this threshold, the skill is in the Over Threshold state 211. As previously noted in conjunction with FIG. 3, this is a fact, not a prediction. If the OCW has not exceeded the upper threshold, a determination is made in step 256 as to whether the OCW is greater than or equal to a specified lower threshold. If not, the skill is in the Over Served state 215. If the OCW is greater than or equal to the lower threshold, a determination is made in step 258 as to whether the PWT is greater than the upper threshold. If the PWT has exceeded this threshold, the skill is in the Current Jeopardy state 212. As previously noted, PWT incorporates both current wait time, which is factual information, and predicted future wait time, e.g., weighted advance time (WAT).

If PWT has not exceeded the upper threshold, a determination is made in step 260 as to whether the call corresponds to a real-time media type. If not, the skill is in the branded range, i.e., the Within Range service state 214. If the call is a real-time media type call, a determination is made in step 262 as to whether the WAT is less than or equal to a particular value indicative of low call volume, 30 seconds in this example. If WAT is not less than or equal to the particular value, the skill is in the Within Range state 214. Otherwise, a determination is made in step 264 as to whether the EWT of the last call has exceeded the upper threshold. If the EWT of the last call has exceeded the upper threshold, the skill is in the Future Jeopardy state 213. If the EWT has not exceeded the upper threshold, the skill is in the Within Range state 214. If step 252 determines that there is no work in queue for the particular skill, a determination is made in step 266 as to whether agents are idle. If there are no agents idle, the skill is in the Queue Empty state 216. Otherwise, the skill is in the Agents Idle state 217.

It is apparent from the FIG. 5 flow diagram that the WAT test in step 262 determines whether the EWT predictor is believed to be sufficiently accurate for real-time media. If the predictor is believed to be sufficiently accurate based on the WAT test, the predictor may be used to place the skill in the Future Jeopardy state 213. If the predictor is believed to be inaccurate, the skill will not be placed in the Future Jeopardy state 213 regardless of its value.

It should be noted that various other types of tests could be used singly or in combination to determine if a given predictor is likely to be accurate. Other tests that may be used instead of or in conjunction with the above-noted WAT test include, e.g., number of call arrivals in a recent period, average handling time in a recent period, etc.

As a result of the FIG. 5 processing operations, the border or demarcation between the Current Jeopardy state 212 and Future Jeopardy state 213 is flexibly moved to rely more or less on facts rather than predictions as the accuracy of the predictor changes. In addition, this kind of test could be incorporated into the determination of what type of announcement to play to a caller or whether to accept a call or return a busy signal.

The processing operations of FIG. 5 may be repeated periodically for one or more different skills in order to determine whether the desired branded service level is being met for each of the skills. For example, these operations may be repeated for a given skill each time a call is placed in or removed from a queue, or on a periodic basis.

It should be understood that the above-described branded service level processing, dynamic agent pooling and dynamic use of predictive algorithms are not limited to use with voice calls, but are instead more generally applicable to any work tasks that arrive from a customer, e.g., e-mail, fax, text chat, voice over IP, etc., as well as to workflow and/or customer fulfillment generated work tasks that are part of, e.g., a workflow system in which various work tasks dealing with actual or electronic "paperwork," contacts with customers, approvals, etc. that must be completed in order to fulfill a specified customer need.

The invention provides a number of advantages over conventional techniques. For example, the invention in the illustrative embodiment allows the call center to be more responsive to the customer, provides a more exact matching of caller need to agent skill, and provides more useful information to an agent handling an incoming voice call.

A call center configured in accordance with the invention may be distributed over multiple sites. For example, the processing operations described above may be performed in a remote or centralized system before a given call or other communication is delivered to an available agent at a particular local site.

The above-described embodiments of the invention are intended to be illustrative only. For example, it should be noted that the exemplary configuration of the call center shown in FIG. 1 may be altered to incorporate a wide variety of different arrangements of components to provide the call processing functions described herein. One such alternative arrangement may be configured such that the processing functions described herein are implemented in a so-called "off-board" server, e.g., a server outside of an ACD system. In this type of arrangement, one or more servers control the distribution of work to agents in an enterprise, such that the processing functions related to distribution can be moved in whole or in part from the ACD system to the servers. The term "call center" as used herein is intended to include these and other alternative systems in which the present invention can be implemented.

In addition, as previously noted, the invention can be applied to a wide variety of communications other than calls, including faxes, e-mails, text chat, voice over IP, etc. It should also be noted that the invention may be implemented in the form of a computer-readable medium or other similar medium containing software which, when executed by a computer or other type of processor, will cause the processor to implement the processing functions described above. For example, the BCMS 110, call vector 140, agent selector 150 and other elements of ACD system 101 may each be implemented at least in part as one or more software programs stored in memory 115 or any other computer readable medium associated with the ACD system 101, and executed by processor 116 or other processing hardware associated with the ACD system 101. A variety of other implementations may also be used to provide communication processing operations based on service state in accordance with the invention. These and numerous other alternative embodiments within the scope of the following claims will be apparent to those skilled in the art.

What is claimed is:

1. A method of processing communications in a call center, the method comprising the steps of:

determining which of a plurality of designated service states is associated with at least one of a particular skill and a particular type of communication, supported by one or more agents of the call center, wherein the plurality of service states comprises at least first, second and third service states corresponding to a first service level, a second service level representative of an over-service condition relative to the first service level, and a third service level representative of an under-service condition relative to the first service level, respectively; and adjusting a communication processing function of the call center if the particular skill or type of communication is associated with a state other than the first service state corresponding to the first service level.

2. The method of claim 1 wherein the plurality of designated service states comprises two or more of an over threshold state, a current jeopardy state, a future jeopardy state, a within range state, an over served state, a queue empty state and an agents idle state, wherein the first service state is the within range state.

3. The method of claim 2 wherein the particular skill or type of communication is associated with the over threshold state if there is at least one communication in queue for the skill and a wait time of an oldest waiting communication in queue exceeds a specified upper threshold.

4. The method of claim 2 wherein the particular skill or type of communication is associated with the current jeopardy state if there is at least one communication in queue for the skill and a predicted wait time of a communication in queue exceeds a specified upper threshold.

5. The method of claim 2 wherein the particular skill or type of communication is associated with the future jeopardy state if there is at least one communication in queue for the skill and an estimated wait time of a communication in queue exceeds a specified upper threshold.

6. The method of claim 2 wherein the particular skill or type of communication is associated with the within range state if there is at least one communication in queue for the skill and a wait time of an oldest waiting communication in queue is greater than or equal to a specified lower threshold.

7. The method of claim 2 wherein the particular skill is associated with the queue empty state if there no communications in queue and none of the agents are idle.

8. The method of claim 2 wherein the particular skill is associated with the agent idle state if there no communications in queue and at least one of the agents is idle.

9. The method of claim 1 wherein the step of adjusting a communication processing function of the call center if the particular skill or type of communication is associated with a state other than the first service state corresponding to the first service level further comprises the step of determining an agent pool for the skill based at least in part on the service state of the skill.

10. The method of claim 9 wherein a different agent pool is specified for each of at least a subset of the plurality of service states by specifying a different set of skill preferences eligible for each of the service states in the subset.

11. The method of claim 1 further including the step of determining if a given predictor should be used in a determination of which of the service states is to be associated with the particular skill.

12. The method of claim 11 wherein the step of determining if a given predictor should be used further includes the step of performing a test involving at least one of a weighted advance time, the number of communication arrivals in a designated period, and an average communication handling time in a designated period.

13. The method of claim 1 wherein at least one of the first, second and third service levels is characterized at least in part by a branded service metric.

14. The method of claim 13 wherein the branded service metric provides a certain maximum score for handling a communication within a specified branded range, and a lower score for handling a communication with a particular amount of over-service or under-service.

15. The method of claim 13 wherein the branded service metric is based at least in part on performance relative to a specified branded range.

16. The method of claim 13 wherein the branded service metric includes a reference to a specified branded range.

17. The method of claim 1 wherein associated with each of the plurality of designated service states is a different color in accordance with a specified color scheme for use in display of corresponding service state indicators.

18. An apparatus for processing communications in a call center, the apparatus comprising:

a memory for storing information regarding a plurality of designated service states, at least one of the plurality of states representing at least one of a particular service level and a particular type of communication, wherein the plurality of service states comprises at least first, second and third service states corresponding to a first service level, a second service level representative of an over-service condition relative to the first service level, and a third service level representative of an under-service condition relative to the first service level, respectively; and a processor coupled to the memory and operative to determine which of the designated service states is associated with at least one of a particular skill and a particular type of communication supported by one or more agents of the call center, and to adjust a communication processing function of the call center if the particular skill or type of communication is in a state other than the first service state corresponding to the first service level.

19. An article of manufacture containing one or more software programs which, when executed in a processor, cause the processor to perform the steps of:

determining which of a plurality of designated service states is associated with at least one of a particular skill and a particular type of communication, supported by one or more agents of the call center, wherein the plurality of service states comprises at least first, second and third service states corresponding to a first service level, a second service level representative of an over-service condition relative to the first service level, and a third service level representative of an under-service condition relative to the first service level, respectively; and adjusting a communication processing function of the call center if the particular skill or type of communication is associated with a state other than the first service state corresponding to the first service level.

20. A method of processing communications in a call center, the method comprising the steps of:

determining which of a plurality of designated service states is associated with at least one of a particular skill and a particular type of communication, supported by one or more agents of the call center, wherein at least one of the plurality of states represents a particular service level; and adjusting a communication processing function of the call center if the particular skill or type of communication is associated with a state other than the state representing the particular service level;

wherein the particular service level is characterized at least in part by a branded service metric.

* * * * *